(12) United States Patent
Lovitt et al.

(10) Patent No.: US 9,085,262 B2
(45) Date of Patent: Jul. 21, 2015

(54) TINTING INDICATION OF ENVIRONMENTAL CONDITIONS

(71) Applicant: Microsoft Corporation

(72) Inventors: Andrew W. Lovitt, Redmond, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 13/647,383

(22) Filed: Oct. 8, 2012

(65) Prior Publication Data

US 2014/0097955 A1 Apr. 10, 2014

(51) Int. Cl.
G08B 21/00 (2006.01)
B60R 1/00 (2006.01)

(52) U.S. Cl.
CPC .......................................... *B60R 1/00* (2013.01)

(58) Field of Classification Search
CPC ........... B60R 1/12; B60R 1/00; B60Q 1/2665
USPC .......................................... 340/540, 435–438
See application file for complete search history.

(56) References Cited

U.S. PATENT DOCUMENTS

| | | | |
|---|---|---|---|
| 6,925,425 B2 | 8/2005 | Remboski et al. | |
| 7,046,160 B2 | 5/2006 | Pederson et al. | |
| 7,292,152 B2 | 11/2007 | Torkkola et al. | |
| 7,579,940 B2 | 8/2009 | Schofield et al. | |
| 7,696,863 B2 | 4/2010 | Lucas et al. | |
| 7,839,292 B2 | 11/2010 | Wang et al. | |
| 8,511,841 B2 | 8/2013 | Varaprasad et al. | |
| 2007/0001830 A1* | 1/2007 | Dagci et al. | 340/438 |
| 2009/0116098 A1* | 5/2009 | Chang | 359/275 |
| 2011/0010041 A1 | 1/2011 | Wagner et al. | |
| 2011/0199202 A1 | 8/2011 | De Mers et al. | |
| 2011/0261199 A1 | 10/2011 | Schmidt et al. | |
| 2012/0062743 A1 | 3/2012 | Lynam et al. | |
| 2012/0249797 A1 | 10/2012 | Haddick et al. | |
| 2013/0120166 A1 | 5/2013 | Kommuri et al. | |
| 2013/0147615 A1* | 6/2013 | Chen et al. | 340/425.5 |
| 2013/0249684 A1* | 9/2013 | Hatakeyama et al. | 340/435 |

FOREIGN PATENT DOCUMENTS

| | | |
|---|---|---|
| DE | 102008064022 A1 | 9/2009 |
| DE | 102010007241 A1 | 9/2010 |

OTHER PUBLICATIONS

International Search Report and Written Opinion, PCT/US2013/060224, Apr. 22, 2014, 10 pages.
(Continued)

*Primary Examiner* — Mark Rushing
(74) *Attorney, Agent, or Firm* — John Jardine; Jim Banowsky; Micky Minhas

(57) ABSTRACT

Environmental hazards and safe conditions can be indicated to an operator of a vehicle. An audio signal of varying intensities can be played to indicate the severity of a potential hazard. An audio signal can be played at different locations in the vehicle cabin to indicate the location of a potential hazard. Surfaces such as but not limited to windows can be tinted to indicate a hazardous or safe condition. Tinting can be of various intensities commensurate with a potential hazard. Location of tinting can indicate the location of a potential hazard.

20 Claims, 3 Drawing Sheets

(56) References Cited

OTHER PUBLICATIONS

Baldock, et al., "Front side window tinting visual light transmittance requirements", Retrieved at <<http://casr.adelaide.edu.au/publications/researchreports/CASR002.pdf>>, Center for Automatic Safety Research Report Series, Apr. 2004, pp. 15.

Ciardelli, et al., "Interaction Modeling in Automotive Applications: a Cognitive Approach", Retrieved at <<http://ieeexplore.ieee.org/stamp/stamp.jsp?tp=&arnumber=5753453>>, IEEE International Multi-Disciplinary Conference on Cognitive Methods in Situation Awareness and Decision Support, Feb. 22-24, 2011, pp. 4.

"Interaction and Management of Devices Using Gaze Detection", U.S. Appl. No. 13/474,723, filed May 18, 2012, pp. 34.

\* cited by examiner

TINTING INDICATION OF ENVIRONMENTAL CONDITIONS

BACKGROUND

Vehicle collisions are a leading cause of injury worldwide. One way to increase safety is to reduce the chances of operator error. On-board electronics and in-vehicle information systems are becoming standard in the industry. These systems are able to collect a wide range of information.

SUMMARY

An environmental hazard indicator can indicate to a user that a potentially dangerous condition exists. An environmental hazard indicator can indicate to a user that a safe condition exists. An indicator can be an auditory indicator. An indicator can be a visual indicator. An indicator can be a haptic indicator. An audio signal can be played in varying intensities in the vehicle, the intensity commensurate with the degree of danger. The audio signal can be played in varying locations in the vehicle, the location indicative of the direction of the perceived danger. An audio signal can travel within the vehicle (e.g., from speaker to speaker within the vehicle) corresponding to a changing location of the perceived danger. A visual indicator can comprise tinting one or more surfaces (e.g., windows, mirrors, etc.) indicative of the location of the perceived danger. Tinting of surfaces can be progressive, moving in a direction indicative of a direction in which the hazard is moving. Tinting of surfaces can change in intensity corresponding to a degree of danger. User intent can be surmised and can be used to determine the location at which the visual indication appears. Surmised user intent can be used to determine a potential dangerous condition or situation. Indicators employed in a particular situation can be influenced or determined by policy. Policy can be determined by a government, group, organization, owner, agent, user or operator and can be user-specific. Indicators can be user-specific. Policy, location, environmental conditions and other information can be retrieved or pushed from "the cloud".

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Vehicles including but not limited to automobiles and airplanes are becoming more and more complicated. Vehicles can include sensing devices including cameras, microphones, and many other types of devices. The information available from the sensors can be used to detect potential hazards. The potential hazards can be indicated to the occupants of the vehicle in such a way that the occupants of the vehicle are not cognitively overloaded. The information available from the sensors can be used to detect safe conditions. The safe condition can be indicated to the occupants of the vehicle in such a way that the occupants of the vehicle are not cognitively overloaded.

The intent of the operator of the vehicle can be surmised by detecting the direction in which the operator is gazing. One example of gaze detection is described more fully in U.S. patent application Ser. No. 13/474,723, entitled "INTERACTION AND MANAGEMENT OF DEVICES USING GAZE DETECTION", filed May 18, 2012. The intent of the operator of the vehicle can be surmised by body movements, including but not limited to shifting of body weight, turning of the upper body and so on.

In response to surmising the operator intent, detection of external hazards, safe conditions and so on, an indication of the hazard/safe condition can be presented to the occupants of the vehicle. Indicators can include but are not limited to any of or any combination of: a visual, audio or haptic indication of the hazard. The direction of the hazard can be indicated. One method of changing the perceived locations of sounds sources so as to reduce the cognitive load on the user is described in U.S. Publication No. 20120114130. The indicators can vary in accordance with the imminence or intensity of the perceived danger. The indicators can vary with respect to location or direction of the perceived danger. The indicators can vary based on policy. The indicators employed to indicate the hazard/safe condition can be user-specific.

Indication of Environmental Hazards

Figure 1:
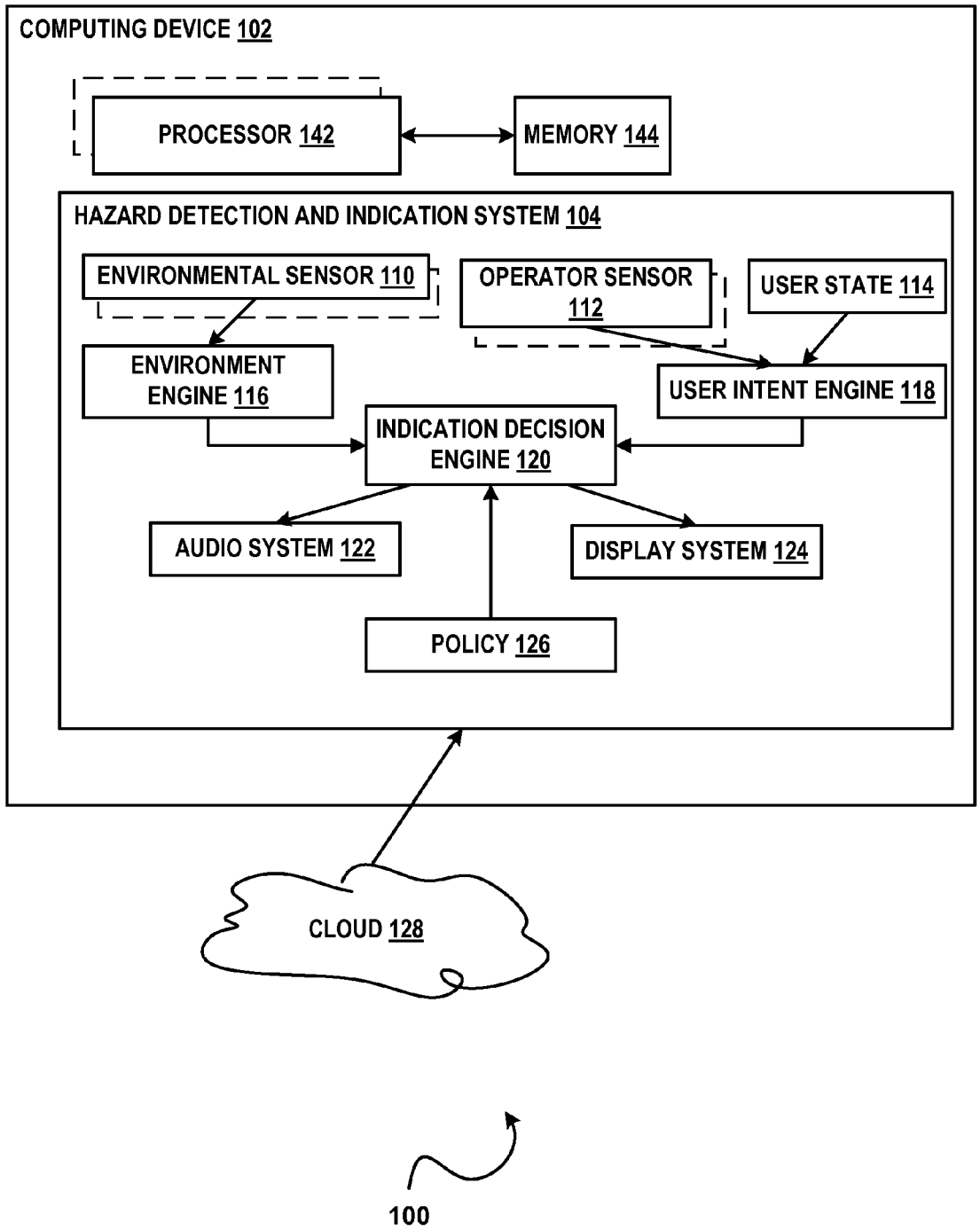
FIG. 1 illustrates an example of a system 100 that detects and indicates potential hazards and/or safe conditions in accordance with aspects of the subject matter described herein.

FIG. 1 illustrates a block diagram of an example of a system 100 that detects and indicates potential hazards/safe conditions in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may be incorporated within a vehicle.

System 100 can include one or more computers or computing devices such as computing device 102. Computing device 102 can include one or more processors such as processor 142, etc., a memory such as memory 144, and one or more modules of an environmental hazard detector and indicator as described more fully below.

System 100 can include or be associated with one or more modules or devices comprising an environmental hazard detector/safe condition detector and indicator such as environmental hazard detector/safe condition detector and indicator 104. Environmental hazard detector/safe condition detector and indicator 104 can include any combination of: one or more environmental sensors 110, etc., one or more operator sensors 112, etc., user state information 114, an environment engine 116, a user intent engine 118, an indication decision engine 120, an audio system 122, a display system 124 and policy information 126. Information including but not limited to policy information, location information, weather information, user state information, and so on can be downloaded from the cloud 128.

Environmental sensors 110, etc. can be located on one or more of and in any combination of: the front, rear, top, bottom, sides, front left, front right, rear left, rear right of the vehicle. One or more of the environmental sensors can be integrated into a component (e.g., mirror, panel, light, bumper, landing gear, etc.) of the vehicle. Environmental sensors can include any combination of devices including but not limited to: a camera, depth camera, laser, radar, sonar, GPS (global positioning service) information, information from the cloud, microphone, proximity detector or any suitable sensor. The environment engine 116 can receive and process information from the environmental sensors 110, etc. The environment engine 116 can pass the processed information to the indication decision engine 120 for further processing.

Operator sensors 112, etc. can be located on one or more of and in any combination of: the front, rear, top, bottom, sides, front left, front right, rear left, rear right of the cabin of the vehicle. One or more of the operator sensors can be integrated into a component (e.g., mirror, panel, light, dashboard, gauge, infotainment system, etc.) of the vehicle cabin. Operator sensors 112 can include any combination of devices including but not limited to: a camera, depth camera, laser, radar, sonar, information from the cloud, microphone, gaze detector, movement detector or any suitable sensor. Operator sensors 112, etc. can monitor the operator or operators of the vehicle to detect actions of the operator(s). Operator sensors 112, etc. can monitor the operator or operators of the vehicle to detect reactions of the operator(s) to a danger indicator or to a safe condition indicator. Operator sensors 112, etc. can monitor the operator or operators of the vehicle to surmise intentions of the operator(s) that can potentially precipitate a hazard condition.

User state information 114 can be downloaded from the cloud 128 or can be stored in the vehicle either in the computing device 102 or on a device or medium associated with the computing device 102. User state information 114 can be provided to the computing device 102 on a mobile data storage device such as a thumb drive or the like. User state information 114 can be used to identify a particular operator of the vehicle. Operator identity may be verified using biometric data such as fingerprints, voice recognition data, iris recognition, retina identification and so on. User state information 114 can be downloaded from the cloud 128 or stored in the vehicle or on a device such as a thumb drive, etc.

The user intent engine 118 can receive user state information and information from the operator sensors 112, etc. The user intent engine 118 can pass the processed information to the indication decision engine 120 for further processing.

The indication decision engine 120 can receive information from the environment engine 116 and the user intent engine 118 and can determine presence of a potential hazard therefrom. The indication decision engine 120 can determine presence of a potential hazard by creating a model of the vehicle and its environment. The indication decision engine 120 can determine the presence of a potential hazard based on changing environmental parameters. The indication decision engine 120 can monitor the environment periodically or continuously to ensure that arising hazards are detected. The model can be updated based on moving objects, stationary objects, height, direction, speed of objects, and so on.

The indication decision engine 120 can receive policy information 126. Examples of policy information include but are not limited to: the maximum and minimum intensity of tinting of surfaces, whether to use auditory or visual hazard indicators or haptic indicators or any combination thereof, and so on. Policy information 126 can provide criteria by which safe conditions or hazards conditions are determined. Policy information can be modifiable. Policy information may be modifiable by a manufacturer of the vehicle, by a user of the vehicle, by an operator of the vehicle, by an owner of the vehicle or by an agent thereof or by any other specified entities. Policy information 126 can be stored in the computing device or can be associated with the computing device. Policy information 126 can be received from the cloud 128.

In response to receiving the information from the environment engine 116, the user intent engine 118 and the policy information 126, the indication decision engine 120 can determine that a potential hazardous condition exists or is imminent and can determine a hazard indication to provide to the occupants of the vehicle. In response to receiving the information from the environment engine 116, the user intent engine 118 and the policy information 126, the indication decision engine 120 can determine that a safe condition exists and can determine a safe condition indication to provide to the occupants of the vehicle. The indication decision engine 120 can trigger an auditory alarm generated by an audio system 122. The indication decision engine 120 can trigger a visual alarm generated by a display system 124. The indication decision engine 120 can trigger a haptic alarm by vibrating a vehicle or a portion of the vehicle such as the steering wheel or operator's seat. The potential hazard or safe condition can be indicated using a mechanism that does not overwhelm the operator's cognitive ability.

A visual potential hazard/safe condition indication can include dynamic window tinting. The windows can be tinted any color (and in any way including shining LEDs through the window from below). Tinting can increase and decrease in intensity commensurate with the degree of hazard and/or imminence of hazard. For example, the operator's side window could be tinted green indicating that it is safe to move into the lane adjacent to the operator's side of the vehicle. The operator's side window could be tinted red indicating that it is not safe to move into the lane adjacent to the operator's side of the vehicle. The tinted window can be any window in the vehicle, or can be any reflective, backlit or transparent surface in the vehicle including but not limited to the surface covering the instrument panel, the steering wheel, the dashboard, the instrument panel, the infotainment system panel, etc.

Contemplated hazards include a vehicular speed in excess of that safe for road conditions or in excess of the speed limit. Tinting can be gated on whether or not the intent engine determines that the user is trying to merge or turn or not. The visual indication can be displayed on a surface in a peripheral area of a field of view of an operator of the vehicle. The surface on which the visual indication is displayed can be based on where the operator is gazing. The surface that is tinted can change (e.g., from window to rear view mirror) in response to the direction of the operator's gaze. The location of the visual indicator can change to signal a change in the location of the hazard/safe condition (e.g., the visual indicator can progress across a surface corresponding to a hazard drawing closer to the vehicle, the visual indicator can increase in size corresponding to a hazard drawing closer to the vehicle, etc.). The visual indication can be removed from a surface on which it is displayed (e.g., in response to the operator responding to the display, to avoid obstructing the view of the operator or for any suitable reason).

An auditory potential hazard indication can include amplification of external sounds generated by the hazard (e.g., an object approaching the vehicle from the rear) within the vehicle. Alternatively, an audio file from a library of audio files can be played. The choice of sounds played can be specified by the policy information 126. The audio alert can be placed in the acoustic field in such a way as to indicate the direction of the hazard by, for example, playing the audio or amplifying the sound through the speaker in the vehicle that is closest to the hazard.

Suppose, for example, that a user has inputted a particular location into a navigation device such as a GPS (global positioning service) device. The navigation device typically plots a route for the vehicle. When the vehicle approaches an exit, the navigation device will know that the operator has to move into the exit lane. This information can be received by the hazard/safe condition identification and indication system. The hazard/safe condition identification and indication system can determine, based on policy information how or if to indicate to the operator information concerning the lane change operation.

Suppose, for example, that the vehicle is going too fast for conditions (e.g., road surface is wet and a hairpin turn is ahead). As the vehicle approaches the hazard, tinting on the windshield can increase in intensity until the operator slows down enough to safely maneuver the turn. Tinting can be influenced by the distance to the turn or by the amount of time the driver has been speeding. Alternatively, instead of tinting the windshield, the surface of the instrument panel can be tinted or any other surface of the vehicle can be used for the display.

Suppose, for example, an operator is attempting to merge into a lane occupied by one or more other vehicles. In response to surmising the operator's intent, a visual showing the operator's vehicle and any other vehicles in the operator's path can be displayed. Similarly, a haptic indicator can indicate a hazard condition by vibrating a part of the vehicle such as the steering wheel, etc.

Figure 2:
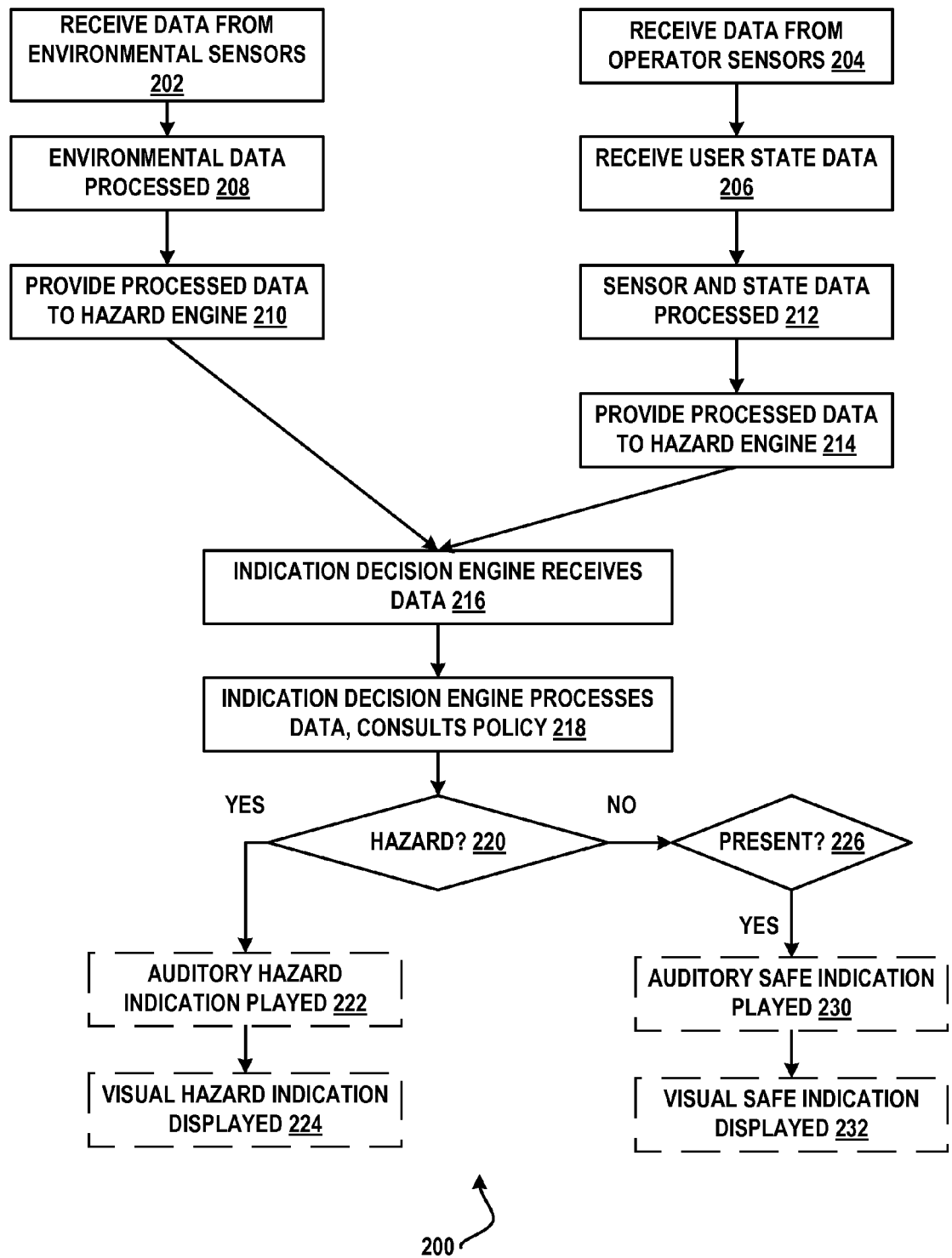
FIG. 2 illustrates an example of a method 200 that detects and indicates potential hazards and/or safe conditions in accordance with aspects of the subject matter disclosed herein.

FIG. 2 illustrates a method 200 that can detect and indicate potential hazards/safe conditions in accordance with aspects of the subject matter described herein. The method described in FIG. 2 can be practiced by a system such as but not limited to the one described with respect to FIG. 1. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 environmental sensors provide data to an environment engine. At operation 204 operator sensors provide data to a user intent engine. At operation 206 user state information is provided to a user intent engine. At operation 208 the environment engine processes the environmental sensor data and provides the processed data to the indication decision engine at operation 210. At operation 212 the user intent engine receives the data from the operator sensors and the user state information and processes the data. At operation 214 the user intent engine provides the processed data to the indication decision engine. At operation 216 the indication decision engine receives the processed data from the environment engine and the processed data from the user intent engine. At operation 218 the indication decision engine consults the policy information and determines if a potential hazard condition exists.

In response to detecting a potential hazard, at operation 220 the indication decision engine can determine based on the policy, how or if a hazard indication will be presented. At operation 222 in response to determining that an audible hazard indication is to be presented, an auditory hazard indication can be played. At operation 224, in response to determining that a visual hazard indication is to be presented, a visual hazard indication can be displayed. At operation 226, in response to determining based on policy that no potential hazard condition exists, the indication decision engine can determine based on policy how or if a safe condition indication will be presented. At operation 230 in response to determining that an audible hazard indication is to be presented, an auditory safe condition indication can be played. At operation 232, in response to determining that a visual safe condition indication is to be presented, a visual safe condition indication can be displayed.

Example of a Suitable Computing Environment

Figure 3:
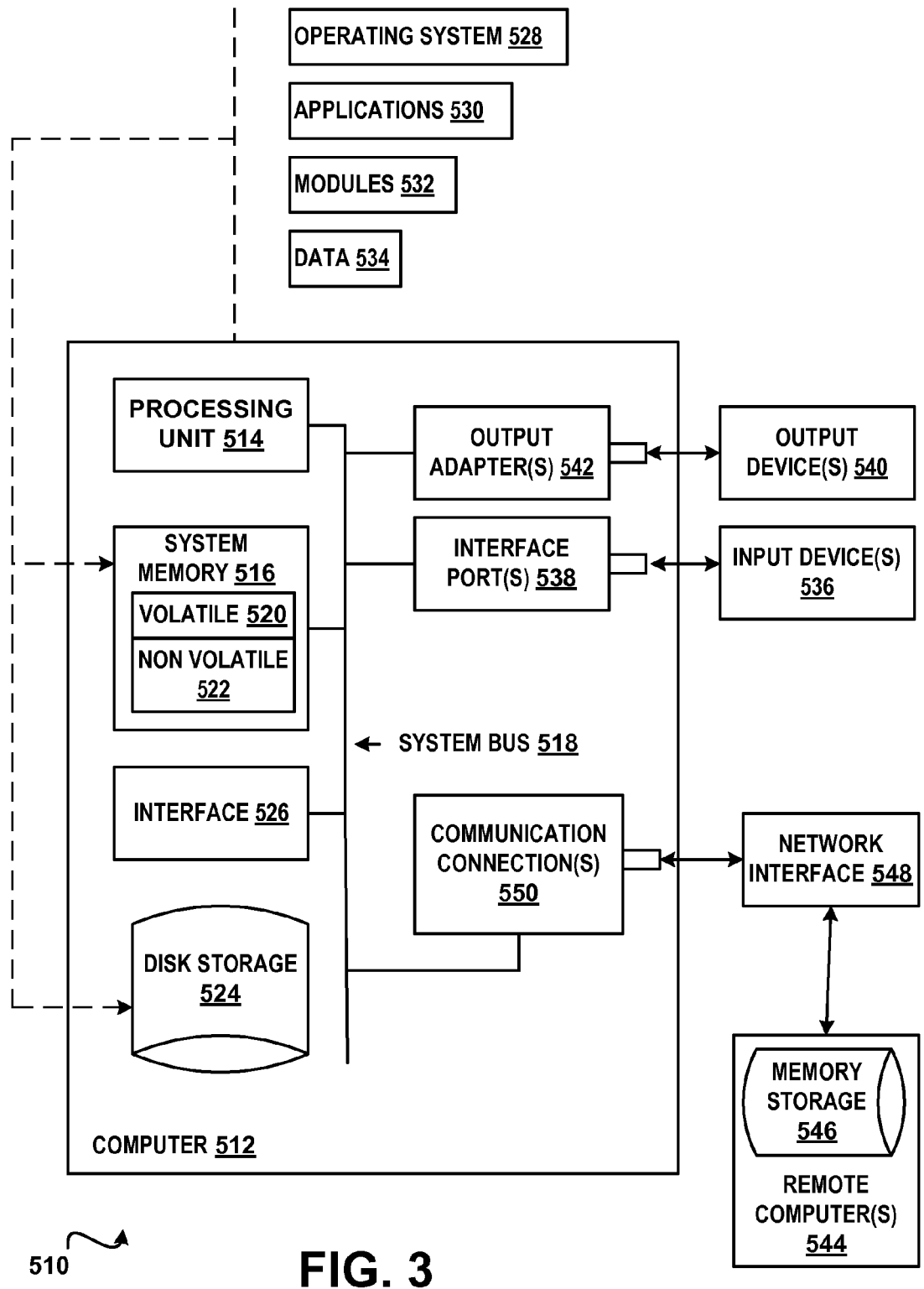
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include transitory media such as, but not limited to, communications signals, modulated carrier waves or any other transitory media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices (s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A vehicular system within a vehicle, the vehicular system comprising:
    a computing device having at least one processor and also having a memory; and
    at least one module having a portion loaded into the memory causing the at least one processor to:
        receive data from at least one sensor of the vehicle;
        analyze the data from the at least one sensor;
        provide at least one tinted surface of the vehicle as a visual indication warning a driver of an environmental condition by tinting the at least one surface of the vehicle in response to detecting the environmental condition from analyzing the data; and
        detect a change in where an operator of the vehicle is gazing, and move a tinting visual indication to a different surface of the vehicle in response to detecting the change;
        wherein the tinted surface comprises a windshield, a window, or a mirror, and wherein the environmental condition that is visually indicated by tinting the surface includes at least one of the following: an unsafe lane change condition, a safe lane change condition, an unsafe merge condition, a safe merge condition, an approaching turn, an approaching exit.

2. The vehicular system of claim 1, wherein the at least one tinted surface of the vehicle comprises an operator's side window.

3. The vehicular system of claim 1, wherein the at least one tinted surface of the vehicle comprises a mirror.

4. The vehicular system of claim 1, wherein the at least one tinted surface of the vehicle comprises at least one of the following: a surface that is backlit, a surface that is reflective.

5. The vehicular system of claim 1, wherein the at least one tinted surface of the vehicle comprises at least one of the following: a surface tinted with a color indicating that the environmental condition is a safe condition, a surface tinted with a color indicating that the environmental condition is a hazard condition.

6. The vehicular system of claim 1, further comprising at least one LED which is positioned in the vehicle to tint a window by shining through the window, thereby providing the visual indication of the environmental condition.

7. The vehicular system of claim 1, wherein the module is modifiable by downloading from a wireless network.

8. The vehicular system of claim 1, wherein the at least one tinted surface of the vehicle comprises at least one of the following: a green tinting to indicate a safe environmental condition, or a red tinting to indicate a potentially hazardous environmental condition.

9. The vehicular system of claim 1, wherein the at least one module has a portion loaded into the memory causing the at least one processor to alter a tinting intensity in response to at least one of the following: changes in a degree of hazard of the environmental condition, changes in an imminence of hazard of the environmental condition.

10. A method for indicating an environmental condition to an operator of a vehicle, the method comprising:
receiving, by a processor of a computer of the vehicle, data from a plurality of sensors comprising at least one environmental sensor of the vehicle;
analyzing the data from the plurality of sensors;
providing at least one tinted surface of the vehicle as a visual indication to warn the vehicle operator of the environmental condition, said providing step comprising tinting the at least one surface of the vehicle in response to detecting the environmental condition from analyzing the data; and
detecting a change in where the operator of the vehicle is gazing, and moving a tinting visual indication to a different surface of the vehicle in response to detecting the change;
wherein the tinted surface comprises a windshield, a window, or a mirror,
and wherein the environmental condition that is visually indicated by tinting the surface includes at least one of the following: an unsafe lane change condition, a safe lane change condition, an unsafe merge condition, a safe merge condition, an approaching turn, an approaching exit.

11. The method of claim 10, wherein the method comprises providing a green window tinting to indicate a safe environmental condition, and providing a red window tinting to indicate a potentially hazardous environmental condition.

12. The method of claim 10, wherein the method comprises altering a tinting intensity in response to at least one of the following: changes in a degree of hazard of the environmental condition, changes in an imminence of hazard of the environmental condition.

13. The method of claim 10, wherein the method comprises progressing a tinting visual indication to a different surface of the vehicle in response to movement of the environmental condition.

14. The method of claim 10, wherein the method further comprises customizing the providing step for a particular operator of the vehicle.

15. A computer-readable storage medium, which is not a communications medium, comprising computer-executable instructions which when executed cause at least one processor of a computing device of a vehicle to:
receive data from a plurality of sensors comprising at least one environmental sensor and at least one operator sensor;
analyze the data from the plurality of sensors;
provide at least one tinted surface of the vehicle as a visual indication of an environmental condition which is identified in a policy, at least in part by tinting the at least one surface of the vehicle in response to detecting the environmental condition from analyzing the data; and
detect a change in where an operator of the vehicle is gazing, and move a tinting visual indication to a different surface of the vehicle in response to detecting the change;
wherein the tinted surface comprises a windshield, a window, or a mirror,
and wherein the environmental condition that is visually indicated by tinting the surface includes at least one of the following: an unsafe lane change condition, a safe lane change condition, an unsafe merge condition, a safe merge condition, an approaching turn, an approaching exit.

16. The computer-readable storage medium of claim 15, comprising further computer-executable instructions, which when executed cause the at least one processor to increase intensity of tinting of at the least one surface of the vehicle to indicate an increasingly hazardous condition, and computer-executable instructions which when executed control an audio signal.

17. The computer-readable storage medium of claim 15, comprising computer-executable instructions, which when executed cause the at least one processor to display the visual indication in a peripheral area of a field of view of an operator of the vehicle.

18. The computer-readable storage medium of claim 15, comprising further computer-executable instructions, which when executed cause the at least one processor to remove the visual indication from a surface at which an operator of the vehicle is looking.

19. The computer-readable storage medium of claim 15, comprising computer-executable instructions, which when executed cause the at least one processor to provide the visual indication on an operator's side window of the vehicle.

20. The computer-readable storage medium of claim 15, comprising computer-executable instructions, which when executed cause the at least one processor to provide visual indications in different colors on the at least one surface of the vehicle in response to detecting different environmental conditions.

* * * * *